Sept. 23, 1941.                T. M. WEST                 2,256,601
             POWER TAKE-OFF MECHANISM FOR TRACTORS
                  Filed Aug. 12, 1939          3 Sheets-Sheet 1

Inventor
T. M. West

By Clarence A. O'Brien
and Hyman Berman
Attorneys

Sept. 23, 1941.　　　T. M. WEST　　　2,256,601
POWER TAKE-OFF MECHANISM FOR TRACTORS
Filed Aug. 12, 1939　　　3 Sheets-Sheet 3

Inventor
T. M. West
By Clarence A. O'Brien
and Hyman Berman
Attorneys

Patented Sept. 23, 1941

2,256,601

UNITED STATES PATENT OFFICE 2,256,601

POWER TAKE-OFF MECHANISM FOR TRACTORS

Thomas M. West, Dorchester, Nebr.

Application August 12, 1939, Serial No. 289,866

1 Claim. (Cl. 74—11)

This invention relates to new and useful improvements in tractors and more particularly to a type of power take-off mechanism therefor.

An important object of the invention is to provide an improved power take-off mechanism which is capable of transmitting power to several different take-off points of a tractor.

Another important object of the invention is to provide a power take-off mechanism for tractors which can be made operative for use either while the tractor is moving or standing.

Still another important object of the invention is to provide a power take-off mechanism wherein such means is provided permitting the use of power take-off pulleys which can be made operative or inoperative while the internal drive mechanism is in operation.

Other objects and advantages of the invention will become apparent to the reader of the following specification:

In the drawing:

Figure 4 is a fragmentary detailed sectional view taken substantially on line 4—4 of Figure 3.

Figure 1:
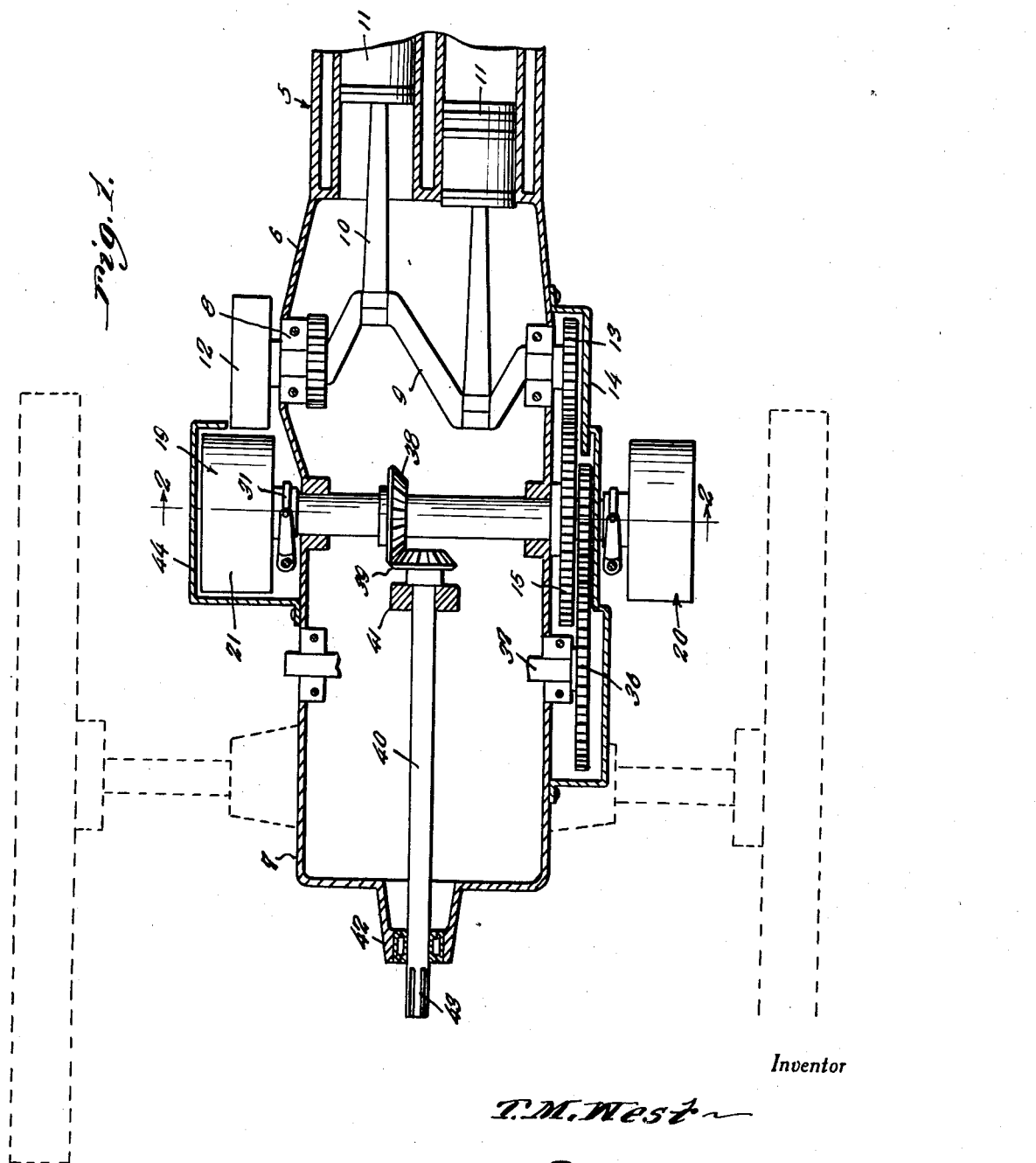
Figure 1 represents a fragmentary horizontal sectional view through the mechanism forming one form of the invention.

Referring to the drawings wherein like numerals designate like parts, it can be seen in Figure 1 that numeral 5 generally refers to a conventional horizontal engine from which the case structure 6 extends rearwardly. This case 6 is provided with the transmission encasing extension 7.

Journaled through bearings 8 in the sides of the case 6 are the ends of the crank shaft 9 and to this crank shaft 9 are connected the connecting rods 10 from the pistons 11 of the engine 5.

One end of the crank shaft 9 is provided with the usual flywheel 12 while the other end is equipped with a gear 13 operating in the gear housing 14 extending along one side of the case 6—7.

The gear 13 meshes with the relatively larger gear 15 in the case 14, the gear 15 being on the power take-off mechanism drive shaft 16.

Figure 2:
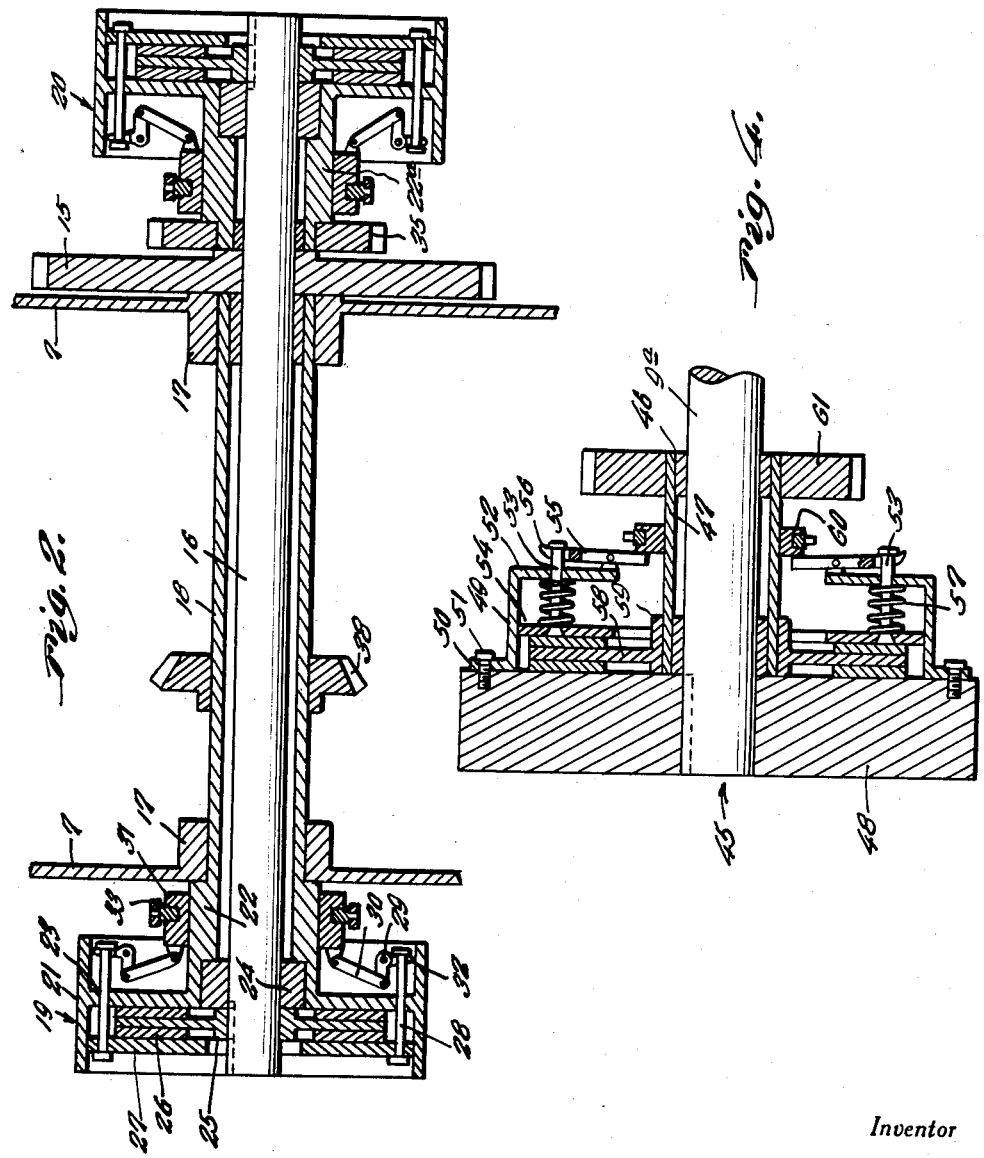
Figure 2 is a transverse sectional view taken substantially on line 2—2 of Figure 1.

As can be clearly seen in Figures 1 and 2, opposite side walls of the casing extension 7 are provided with bearings 17—17 through which the sleeve 18 is journaled.

Extending through the sleeve 18 is the drive shaft 16, with one end of which is associated the power take-off pulley 19 while the power take-off pulley 20 is associated with the opposite end.

As shown in Figure 2, the pulley 19 has the cylindrical portion 21 connected to the hub structure 22 by the radial web 23. This web 23 has an internal bearing 24 for receiving the corresponding end of the shaft 16. The pulley 19 involves a clutch mechanism consisting of the slide plate 25 splined to the corresponding end of the drive shaft 16 and having replaceable clutch faces 26. Numeral 27 represents a movable annulus which is capable of being moved by the pins 28 which are slidable through openings in the web 23 and which are actuated by the bell cranks 29 connected by the pivotal links 30 to the slide collar 31. It will be observed that these pins are headed and the headed portions are engaged by the yoke end 32 of the said bell cranks 29.

The collar 31 is slidable on the hub 22 of the pulley and is operated manually by a yoke 33 pivotally engaged therewith and having suitable hand-engaging means extending therefrom to a point convenient to the operator of the tractor. Obviously, by sliding the collar 31 outwardly the annulus 27 will force the clutch plate 25 against the web 23. Thus traction is transmitted from the shaft 16 to the pulley cylinder 21.

The pulley structure 20 is likewise mounted on the shaft 16 and the only exception in construction is that on the hub 22a is the gear 35 which is in mesh with the gear 36 carried by the shaft 37 which is part of the transmission of the tractor, this transmission which will be located within the case extension 7, not being shown.

As can be seen in Figure 2, a bevel gear 38 is secured to the intermediate portion of the sleeve 18 and this meshes with the beveled gear 39 on the longitudinally extending shaft 40 which and extends out through the tail portion of the is trained through suitable bearing 41 and 42 and extends out through the tail portion of the case extension 7 where it is suitably formed as by having longitudinal slots 43 to accommodate an adapter and is especially intended for driving farm implements.

If desired, one or both of the pulleys 19—20 can be normally encased by a suitable housing 44 which can be conveniently applied or removed from the side of the tractor case.

Figure 3:
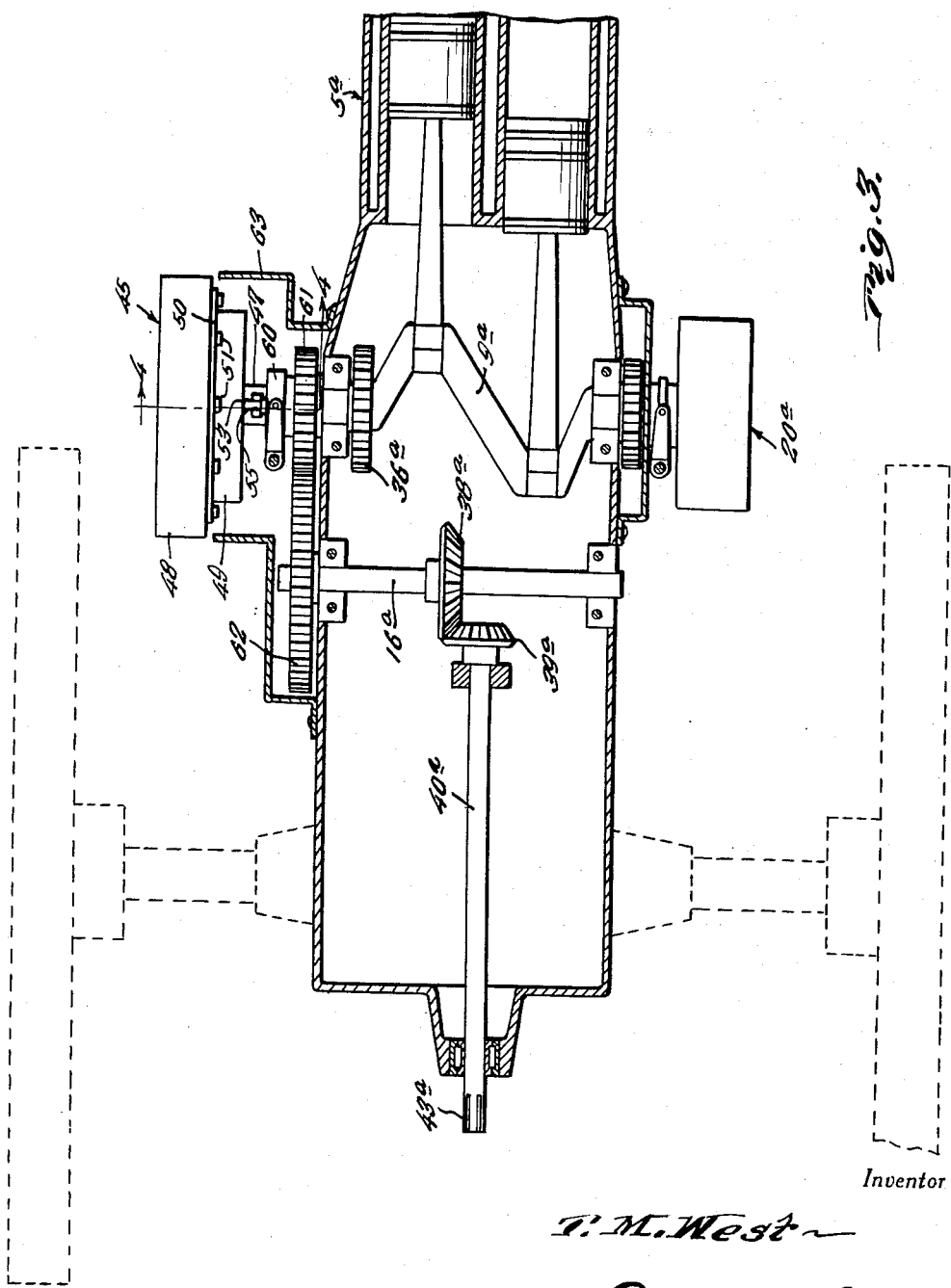
Figure 3 is a fragmentary horizontal sectional view through a slightly modified form of mechanism.

A modified form of the power take-off mechanism is shown in Figure 3, wherein the crank shaft 9a of the horizontal engine generally referred to by reference character 5a incorporates the flywheel 12 of Figure 1 with the power take-off pulley 19 and this improved assembly is generally referred to by numeral 45 and is shown in detail in Figure 4.

As clearly shown in Figure 4, the crank shaft 9a extends through a bearing 46 in the sleeve 47 and has the flywheel body 48 suitably secured thereto. A cylinder 49 having an outstanding flange 50 is secured by this flange and machine screws 51 to one side of the flywheel body 48. This cylinder 49 has the inturned flange 52 through which the pins 53 from the slide annulus 54 operate. Rockable arms 55 are mounted on the outer side of the flange 52 and each has a yoke 56 at its outer end engaging the headed outer end of a corresponding pin 53.

Located on these pins 53 and interposed between the flange 52 and the annulus 54 are the compression springs 57 which serve to normally urge the annulus 54 against the clutch plate 58 which has the slide hub 59 on the outer end of the sleeve 47.

A slide collar 60 is slidably disposed on the sleeve 47 and by some remote detent means is made to hold the rockers 55 in a position to normally relieve the annulus 54 from the clutch plate 58. By releasing such a detent, the annulus 54 will be automatically engaged by the compression spring 57.

The opposite end of the crank shaft 9a is equipped with a pulley 28 corresponding to the pulley mechanism 20 in Figure 2. A gear 36a is provided on the crank shaft for driving the transmission mechanism. (Not shown.) Furthermore, there is a gear 61 in meshing relation with the larger gear 62 on the shaft 16a and on this shaft 16a is the bevel gear 38a meshing with the bevel gear 39a for driving the power take-off shaft 40a and its adapter engageable end 43a.

Suitable gear casing means 63 is provided for the gears 61 and 62 and certain of the mechanism of the assembly 45.

While the foregoing specification sets forth the invention in specific terms it is to be understood that numerous changes in the shape, size and materials may be resorted to without departing from the spirit and scope of the invention as claimed hereinafter.

Having described the invention what is claimed as new is:

In a tractor including an engine and a crankshaft driven from the engine, a flywheel connected to one end of the crankshaft, a short-sleeve rotatably arranged on said end of the crankshaft and disposed inwardly of the flywheel, a housing connected with the inner face of the flywheel and extending over part of the sleeve, clutch means for connecting the flywheel with the sleeve and located in the housing, manually operated means for actuating the clutch means to connect the sleeve with the flywheel or disconnect the sleeve therefrom, a gear on the inner end of the sleeve, a shaft rotatably supported by the tractor, a gear thereon meshing with the gear of the sleeve and a take-off shaft driven from the last-mentioned shaft.

THOMAS M. WEST.